(12) United States Patent
Coombs

(10) Patent No.: US 6,603,490 B1
(45) Date of Patent: Aug. 5, 2003

(54) WEB SITE SCREEN ROTATION

(76) Inventor: John F. Coombs, 10 Gordon Ave., Salem, NH (US) 03079

( * ) Notice: Subject to any disclaimer, the term of this patent is extended or adjusted under 35 U.S.C. 154(b) by 0 days.

(21) Appl. No.: 09/460,172

(22) Filed: Dec. 10, 1999

(51) Int. Cl.[7] .................................................. G06F 3/00
(52) U.S. Cl. ......................... 345/783; 345/781; 345/731; 345/732; 345/766; 345/767; 345/854; 707/501.1
(58) Field of Search ................................. 345/619, 781, 345/783, 730, 731, 732, 854, 766, 767, 760, 744; 707/501.1

(56) References Cited

U.S. PATENT DOCUMENTS

| | | | | | |
|---|---|---|---|---|---|
| 5,050,105 A | * | 9/1991 | Peters | ......................... | 345/854 |
| 5,412,775 A | * | 5/1995 | Maeda et al. | ................ | 345/797 |
| 5,613,057 A | * | 3/1997 | Caravel | ................... | 707/500.1 |
| 5,831,607 A | * | 11/1998 | Brooks | ........................ | 345/762 |
| 5,903,729 A | * | 5/1999 | Reber et al. | ................ | 709/219 |
| 6,088,028 A | * | 7/2000 | Gipalo | ........................ | 345/762 |
| 6,177,936 B1 | * | 1/2001 | Cragun | ........................ | 345/781 |
| 6,330,007 B1 | * | 12/2001 | Isreal et al. | ................. | 345/762 |

* cited by examiner

Primary Examiner—Raymond J. Bayerl
Assistant Examiner—Cuong T. Thai
(74) Attorney, Agent, or Firm—Joseph E. Funk

(57) ABSTRACT

A screen rotation tool for use on Internet web sites is disclosed that rotates the order in multiple screens in a list are sequentially displayed to more equitably display all screens in the list.

4 Claims, 2 Drawing Sheets

WEB SITE SCREEN ROTATION

FIELD OF THE INVENTION

This invention relates to Internet web sites and more particularly to a method for rotating multiple screens that are sequentially displayed to display a list of entries in order to assure more equal exposure to all entries on the list.

BACKGROUND OF THE INVENTION

Many Internet web sites are dedicated to one or a few themes and very often these web sites contain lists of other web sites that are also dedicated to the same theme or themes as the present web site. For example, a web site may be hosted by an organization whose theme is rock collecting. On that web site the organization may have one or more lists associated with various facets of rock collecting. One list may be of people or companies that sell polished rocks of different types. Another list may be of people or companies that sell products associated with polishing and displaying rocks, and so forth. Each of these lists may comprise a list totaling upwards of one hundred names or more, and must be displayed over several screens that must be sequentially displayed. Visitors to this rock collecting web site and perusing the lists thereon usually never get through all the screens of names in a list. Also, there is sometimes a cost to be listed in one or more lists on this web site. It is one way of the sources of revenue for the web sites turn a profit, similar to having a listing in the telephone yellow pages.

Individuals who make a business out of different facets of rock collecting, or who have a hobby involving rock collecting will typically visit this exemplary web site fairly frequently to see what is new in the rock collecting field, to look for information, papers or specific products useful in rock collecting, and to participate in chat groups about various facets of rock collecting.

Every time an individual visits such an exemplary web site and go to any particular list thereon they typically see the same first screen, second screen and so on. An individual or company who is near or at the end of any of these lists will less often be seen by a visitor to this list on the rock collecting web site. This is particularly true if the lists are organized alphabetically and an individual's or company's name starts with a letter toward the end of the alphabet, such as with W, Y or Z. Such lists are often organized alphabetically because it makes more sense to organize them this way and it is easier if people visiting the rock collecting web site are looking for a company, individual or other web site by their name, which is often the case. Such individuals or companies having a name starting with a letter toward the end of the alphabet will often be discouraged, will not believe that it is cost effective to pay to have themselves listed on this web site, and will not list themselves in the lists on the web site.

Thus, there is a need in the art for a way to provide more equitable exposure to all those individuals and companies listed in topic lists on a web site.

SUMMARY OF THE INVENTION

The above described need in the prior art is satisfied by the present invention. I provide a way to give more equitable exposure to those individuals and companies in lists found on web sites to visitors to the web sites.

To implement this equitable exposure each screen full of names in a list are frequently and periodically rotated so that over time each screen full of names in the list receive equal and equitable exposure to visitors to the web site.

DESCRIPTION OF THE DRAWINGS

The invention will be better understood upon reading the following Detailed Description in conjunction with the drawings in which.

DETAILED DESCRIPTION

On web sites are often found lists of individuals, company names and/or other web site addresses known as Uniform Resource Locators (URLs). These lists often exceed a single screen full and a web site visitor must initiate an action to step through the many screens in any list. More often than not the web site visitor never reaches and reads list items on screens toward the end of a list. It is the goal of the present invention to periodically and frequently change the order in which each screen full of names in a list are presented to a web site visitor going through the list to achieve an equitable exposure of all names in the list to the visitor.

Figure 1:
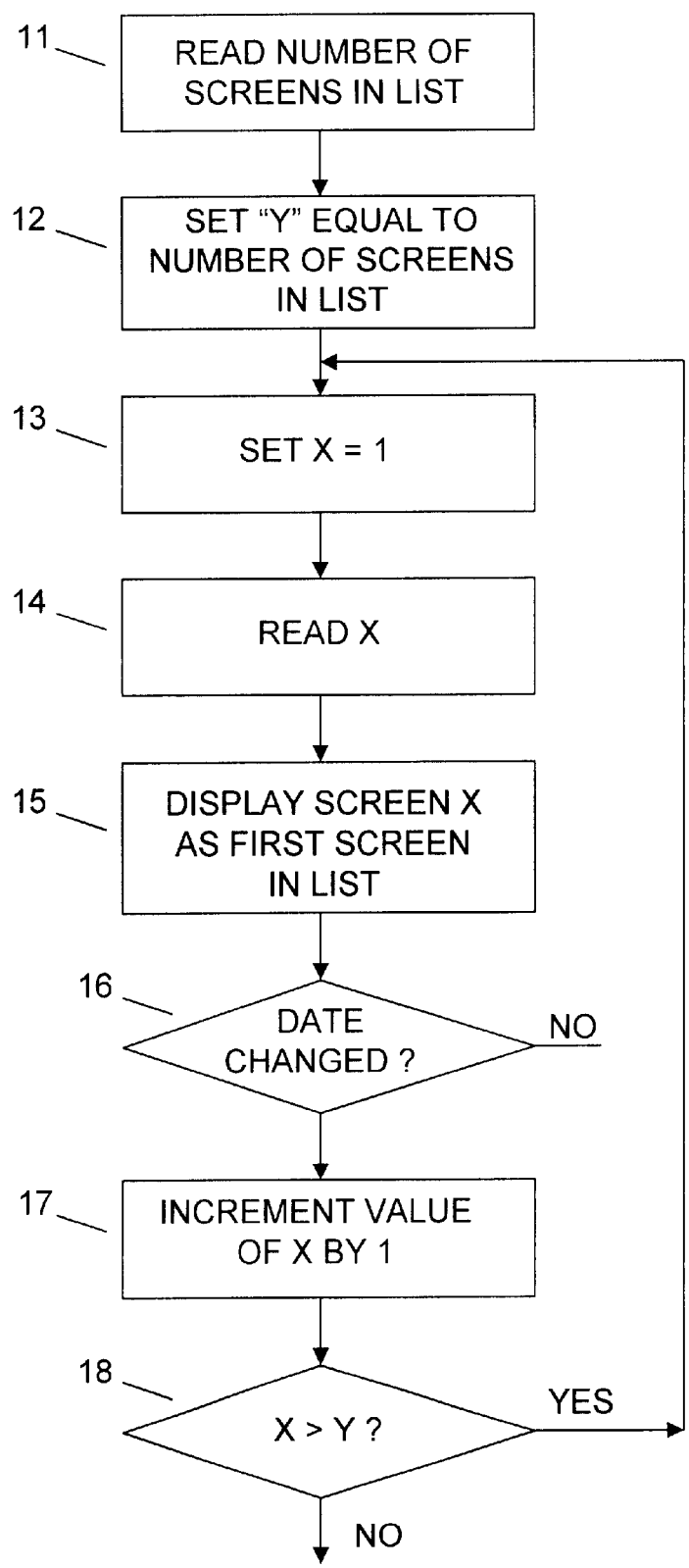
FIG. 1 is a programming flow chart showing how the preferred embodiment of the invention is implemented.

In FIG. 1 is shown a high-level programming flow chart of the preferred embodiment of the invention that provides equitable exposure of all names in a list to a web site visitor. The description of this flow chart is for a single list, but is repeated for each list on any web site.

At block 11 to program first determines the number of screens in a list of names on a web site. For the purpose of this description it is assumed that there are seven screens of names in the list. At block 12 the number of screens in the list is stored in the computer as a value "Y". In the present example Y=7. The program then progresses to block 13 where a value "X" is set equal to 1. The value "X" is the number of a screen in the list and, in the present example, will have a value between one and seven, corresponding to the seven screens of names in the list. The steps accomplished in blocks 11,12 and 13 initialize the operation in accordance with the teaching of the preferred embodiment of the present invention.

At block 14 the computer reads out the value "X" which in the beginning is equal to one (X=1). This indicates that the seven screens of names in the list should be presented in order starting with screen one and progressing through screens seven as the viewer steps through the screens in the list. This is indicated in block 15.

In the preferred embodiment of the invention described herein, the order that the seven screens in the exemplary list are rotated daily. Accordingly, at block 16 the program determines from the computer's internal clock whether or not the date has changed. If the date is still the same program exits decision block 16 at NO and nothing happens. The program continues to use X=1 and displays the screens in the list starting from screen one and progressing through screen seven as described above. If the program determines at block 16 that the computer's internal clock has changed the program exits decision block 16 at YES and at block 17 the value of X is incremented by one.

After the value of X is incremented, at decision block 18 the program determines if the present value of X is greater than the value Y which is the number of screens in the list of the present example. If the decision at block 18 is NO, meaning that X has a value between two and seven, nothing happens and program continues to use the present value of X to display the seven screens in the list. If the decision at block 18 is YES, meaning that the incremented value of X is now equal to eight, a value that exceeds the number of the screens in the list of the present example, the program exits decision block 18 at YES and goes back to block 13 were the value of X is reset to one (X=1).

For example, wherein X=1 initially on day one of operation of the program, the seven screens are sequentially presented in order starting with screen one. After it is determined at block 16 that there is a date change, on date two of operation X=2 and the seven screens are presented in order from screen two through screens seven and then followed by screen one.

When it is determined at block 16 that there is another date change, on day three of operation X=3 and the seven screens are presented in order from screen three through screen seven, followed by screen one and then screen two. When it is determined at block 16 that there is yet another date change, on day four of operation X=4 and the seven screens are presented in order from screen four through screen seven, followed by screens one through three in order. When it is determined at block 16 that there is still another date change, on day five of operation X=5 and the seven screens are presented in order from screen five through screen seven, followed by screens one through four in order. On the next date change, at day six of operation, X=6 and screen six is the first screen presented followed by screen seven, then followed by screens one through five in order. Finally, on day seven of operation, X=7 and screen seven is the first screen presented followed by screens one through six in order.

This process repeats every seven days and once every seven days one of the seven screens is the first screen seen by a visitor to the web site and viewing the list. In this manner all seven screens are provided an equitable opportunity to be the first screen seen by each visitor to the list.

In this preferred embodiment of the invention, the program at decision block 16 may be changed to be any time period, and screen rotation on any list may be varied from minutes to weeks or more.

Figure 2:
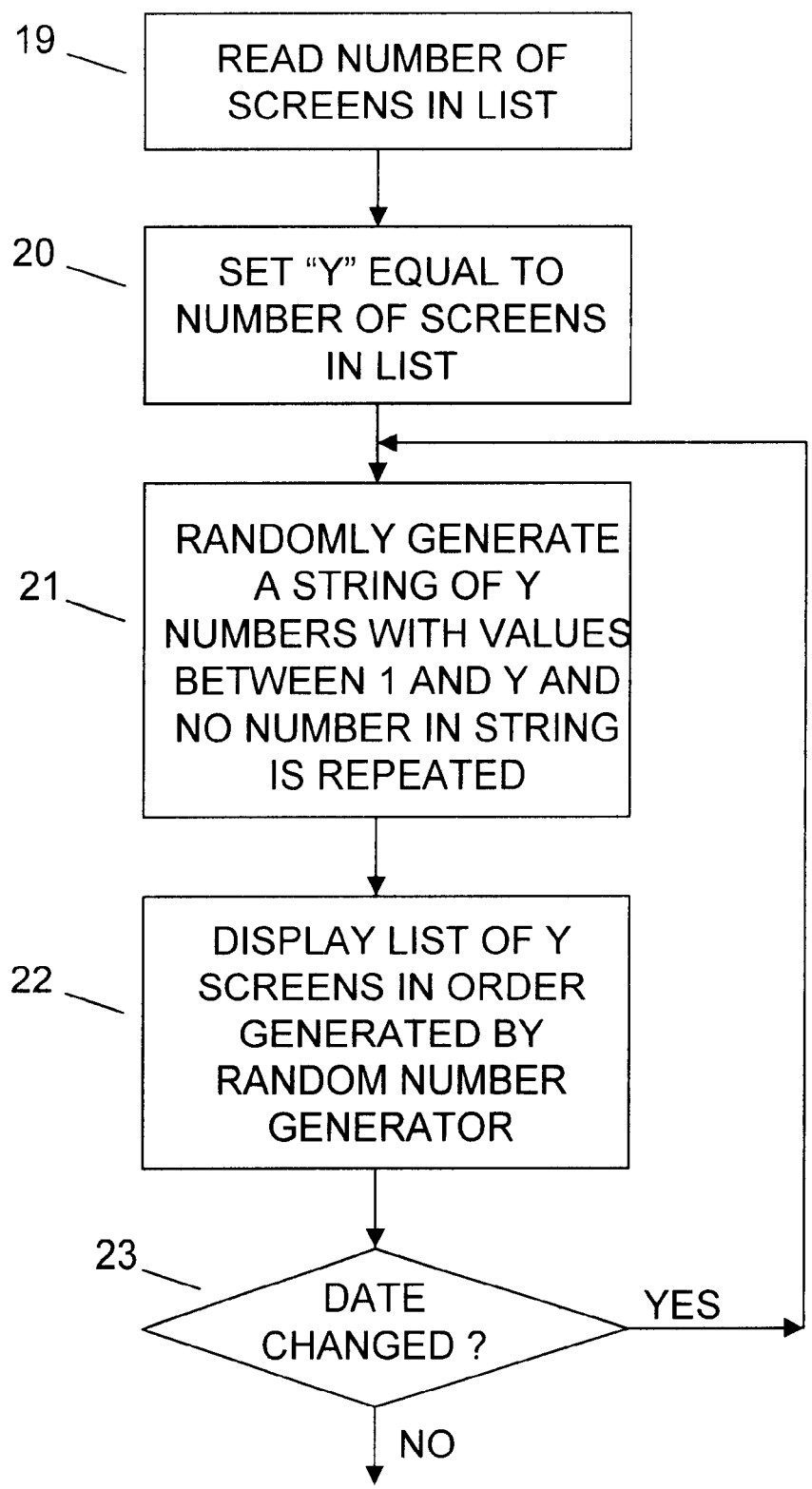
FIG. 2 is a programming flow chart showing an alternative embodiment of the invention.

In an alternative embodiment of the invention, shown in FIG. 2, a random number generator may be used to generate a string of numbers between one and seven that are used to determine the order in which the seven screens in the list are accessed by each visitor to the list.

At block 19 the program first determines the number of screens in a list of names on a web site. These are the screens that are to be rotated. For the purpose of this description of the alternative embodiment of the invention it is assumed that there are seven screens of names in the list. At block 20 the number of screens in the list is stored in the computer as a value "Y". In the present example Y=7. The program then progresses to block 21 where a software implemented random number generator is used to generate a string of Y numbers each having a value between one and Y, and no number in the string is repeated. Thus, for example, one possible number string that might be generated it is 3,7,6, 1,4,5,2. By the use of a random number generator the odds are very high against repeating any particular number string more than other number strings. In this matter all seven screens are provided an equitable opportunity to be the first screen seen by each visitor to the list.

At block 22 to seven screens in the list are sequentially presented in the order determined by the random number generator, as described in the previous paragraph. Thus, for example, with the example random number string generated for the previous paragraph, screen three would be the first screens seen by a visitor to the list, followed by screen seven, screen six, screen 1, screen four, screen five, and finally screen two.

In this alternative embodiment of the invention, the order that the seven screens in the example list are rotated daily. Accordingly, at block 23 the program determines from the computer's internal clock whether or not the date has changed. If the date is still the same program exits decision block 23 at NO and nothing happens. The randomly generated number list previously generated the still used. If the program determines at block 23 that the computer's internal clock has changed the program exits decision block 23 at YES and at block 21 the program randomly generates another string of seven numbers.

This process repeats every seven days. In this alternative embodiment of the invention, the program at decision block 23 may be changed to be any time period, and screen rotation on any list may be varied from minutes to weeks or more. In this manner all seven screens are provided an equitable opportunity to be the first screen seen by each visitor to the list.

While what has described hereinabove is the preferred and one alternative embodiment of the invention, it will be obvious to those skilled in the art that a number of changes may be made in the operation without departing from the spirit and scope of the invention.

What is claimed is:

1. A method for rotating the display of a plurality of screens that are used to display a list of information on an Internet web site to provide more equitable exposure to the information on each of said screens, said method comprising the steps of:

determining the number of screens in said list of information, where the number of screens is X;

initially displaying said plurality of screens in a first order from 1 to X; and periodically changing said order of displaying said plurality of screens, wherein initially said plurality of screens are initially displayed in the order of 1>X in a first period of time; in said second period of time said plurality of screens are displayed in the order of 2>X followed by screen 1; in said third period of time said plurality of screens are displayed in the order of 3>X, 1, 2; in said fourth period of time said plurality of screens are displayed in the order of 4>X, 1, 2, 3; and so on until the periodic changing the order of displaying said plurality of screens is again displaying said plurality of screens in the order 1>X at which time the cycle starts over again.

2. The method in accordance with claim 1 wherein said plurality of screens comprises X screens and further comprising the step of periodically generating a random sequence of numbers, each number in said random sequence of numbers being between 1 and X, and no number in said random sequence of numbers is repeated, and each said random sequence of numbers is used to periodically change the order in which said plurality of screens are displayed.

3. The method in accordance with claim 1 wherein said plurality of screens comprises X screens that are initially displayed in the order from 1 to X as said first order of screens, and further comprising the step of periodically moving the last screen of said plurality of screens to be the first screen displayed to thereby periodically change the order in which said plurality of screens are displayed.

4. A method for rotating the display of a plurality of screens that are used to display a list of information on an Internet web site to provide more equitable exposure to the information on each of said screens, said method comprising the steps of:

determining the number of screens in said list of information, where the number of screens is X;

initially displaying said plurality of screens in a first order from 1 to X;

periodically generating a random sequence of numbers, each number in said random sequence of numbers being between 1 and X, and no number in said random sequence of numbers is repeated, and each said random sequence of numbers is used to periodically change the order in which said plurality of screens are displayed; and periodically changing said order of displaying said plurality of screens by moving the last screen of said plurality of screens to be the first screen displayed to thereby periodically change the order in which said plurality of screens are displayed;

wherein initially said plurality of screens are initially displayed in the order of 1>X in a first period of time, said plurality of screens are displayed in the order of 2>X followed by screen 1 in said second period of time, said plurality of screens are displayed in the order of 3>X, 1, 2 in said third period of time, said plurality of screens are displayed in the order of 4>X, 1, 2, 3 in said fourth period of time, and so on until the periodic changing of the order of displaying said plurality of screens is again displaying said plurality of screens in the order 1>X at which time the cycle starts over again.

\* \* \* \* \*

UNITED STATES PATENT AND TRADEMARK OFFICE
CERTIFICATE OF CORRECTION

PATENT NO. : 6,603,490 B1
APPLICATION NO. : 09/460172
DATED : August 5, 2003
INVENTOR(S) : John F. Coombs It is certified that error appears in the above-identified patent and that said Letters Patent is hereby corrected as shown below:

In the claims:

In column 4, line 32, please replace "1>X" with --1 through X--.

In column 4, line 34, please replace "2>X" with --2 through X--.

In column 4, line 36, please replace "3>X" with --3 through X--.

In column 4, line 38, please replace "4>X" with --4 through X--.

In column 4, line 41, please replace "1>X" with --1 through X--.

In column 6, line 2, please replace "1>X" with --1 through X--.

In column 6, line 4, please replace "2>X" with --2 through X--.

In column 6, line 6, please replace "3>X" with --3 through X--.

In column 6, line 7, please replace "4>X" with --4 through X--.

In column 6, line 11, please replace "1>X" with --1 through X--.

Signed and Sealed this
Ninth Day of April, 2013

Teresa Stanek Rea
*Acting Director of the United States Patent and Trademark Office*